United States Patent
Yi et al.

(10) Patent No.: US 10,703,873 B2
(45) Date of Patent: Jul. 7, 2020

(54) THERMOPLASTIC PREPREG INTERMEDIATE MATERIAL FOR FUEL CELL SEPARATION PLATE AND METHOD FOR MANUFACTURING THERMOPLASTIC PREPREG FOR FUEL CELL SEPARATION PLATE BY USING SAME

(71) Applicant: KOLON INDUSTRIES, INC., Gwacheon-si, Gyeonggi-do (KR)

(72) Inventors: Jee Sung Yi, Yongin-si (KR); Hyun Chul Lee, Yongin-si (KR); Joon Young Yoon, Yongin-si (KR); Eun Jeong Cho, Yongin-si (KR); Chung Seock Kang, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 85 days.

(21) Appl. No.: 15/512,605

(22) PCT Filed: Sep. 23, 2015

(86) PCT No.: PCT/KR2015/010009
§ 371 (c)(1),
(2) Date: Mar. 20, 2017

(87) PCT Pub. No.: WO2016/052912
PCT Pub. Date: Apr. 7, 2016

(65) Prior Publication Data
US 2017/0298200 A1    Oct. 19, 2017

(30) Foreign Application Priority Data

Sep. 29, 2014  (KR) .......................... 10-2014-0129749

(51) Int. Cl.
*B32B 27/12*  (2006.01)
*C08J 5/24*  (2006.01)
(Continued)

(52) U.S. Cl.
CPC ................. *C08J 5/24* (2013.01); *B32B 27/06* (2013.01); *B32B 37/06* (2013.01); *B32B 37/10* (2013.01);
(Continued)

(58) Field of Classification Search
CPC .................................. B32B 27/12; C08J 5/24
See application file for complete search history.

(56) References Cited

U.S. PATENT DOCUMENTS 4,622,091 A * 11/1986 Letterman ............. B29B 15/105
156/286
8,088,306 B2 * 1/2012 Kim .......................... C08K 3/22
252/511

(Continued)

FOREIGN PATENT DOCUMENTS

JP    0691817 A  *  4/1994
JP    4586251 B2    11/2010
(Continued)

OTHER PUBLICATIONS

English Translation of JPH0691817, no date.*
(Continued)

*Primary Examiner* — Andrew T Piziali
(74) *Attorney, Agent, or Firm* — Sughrue Mion, PLLC

(57) ABSTRACT

An intermediate material of a thermoplastic prepreg for a fuel cell separation plate comprises a hydrophobic thermoplastic resin film and a fiber base. The hydrophobic thermoplastic resin film has a degree of crystallization of 1 to 20%, a thickness of 3 to 50 μm, and (iii) a content of an electroconductive material of 1 to 20 wt. %. The film is laminated on at least one surface of the fiber base. The thermoplastic prepreg for a fuel cell separation plate is manufactured by pressurizing the thermoplastic prepreg intermediate material at a temperature higher than the melt-
(Continued)

ing point of the hydrophobic thermoplastic resin film. A fuel cell separation membrane manufactured using the thermoplastic prepreg intermediate material and thermoplastic prepreg is thin and light-weight, and have a good durability.

9 Claims, 1 Drawing Sheet

(51) Int. Cl.
| | |
|---|---|
| *C08K 3/00* | (2018.01) |
| *H01M 8/0228* | (2016.01) |
| *C08J 5/10* | (2006.01) |
| *C08K 3/04* | (2006.01) |
| *B32B 37/18* | (2006.01) |
| *B32B 27/06* | (2006.01) |
| *B32B 37/06* | (2006.01) |
| *B32B 37/10* | (2006.01) |
| *C08J 5/04* | (2006.01) |
| *H01M 8/0213* | (2016.01) |
| *H01M 8/0221* | (2016.01) |
| *H01M 8/0226* | (2016.01) |
| *H01M 8/0206* | (2016.01) |
| *C08K 3/08* | (2006.01) |

(52) U.S. Cl.
CPC ............ *B32B 37/182* (2013.01); *C08J 5/042* (2013.01); *C08J 5/046* (2013.01); *C08J 5/10* (2013.01); *C08K 3/00* (2013.01); *C08K 3/041* (2017.05); *C08K 3/042* (2017.05); *H01M 8/0213* (2013.01); *H01M 8/0221* (2013.01); *H01M 8/0226* (2013.01); *H01M 8/0228* (2013.01); *B32B 2305/18* (2013.01); *B32B 2309/02* (2013.01); *B32B 2309/105* (2013.01); *B32B 2309/12* (2013.01); *B32B 2398/20* (2013.01); *B32B 2457/18* (2013.01); *C08J 2300/22* (2013.01); *C08J 2323/12* (2013.01); *C08J 2367/00* (2013.01); *C08J 2367/02* (2013.01); *C08J 2375/04* (2013.01); *C08J 2387/00* (2013.01); *C08J 2477/00* (2013.01); *C08K 2003/0806* (2013.01); *H01M 8/0206* (2013.01); *Y02P 70/56* (2015.11)

(56) References Cited

U.S. PATENT DOCUMENTS

| | | | | |
|---|---|---|---|---|
| 2006/0182941 | A1* | 8/2006 | Yano | B82Y 30/00 |
| | | | | 428/292.1 |
| 2012/0292828 | A1* | 11/2012 | Inston | B29C 59/14 |
| | | | | 264/483 |

FOREIGN PATENT DOCUMENTS

| | | | |
|---|---|---|---|
| KR | 10-2006-0134203 | A | 12/2006 |
| KR | 10-2007-0049809 | A | 5/2007 |
| KR | 10-2009-0072709 | A | 7/2009 |
| KR | 10-2012-0021797 | A | 3/2012 |
| KR | 10-2014-0077480 | A | 6/2014 |

OTHER PUBLICATIONS

International Searching Authority, International Search Report for PCT/KR2015/010009 dated Nov. 26, 2015 [PCT/ISA/210].
International Searching Authority, Written Opinion for PCT/KR2015/010009 dated Nov. 26, 2015 [PCT/ISA/237].

* cited by examiner

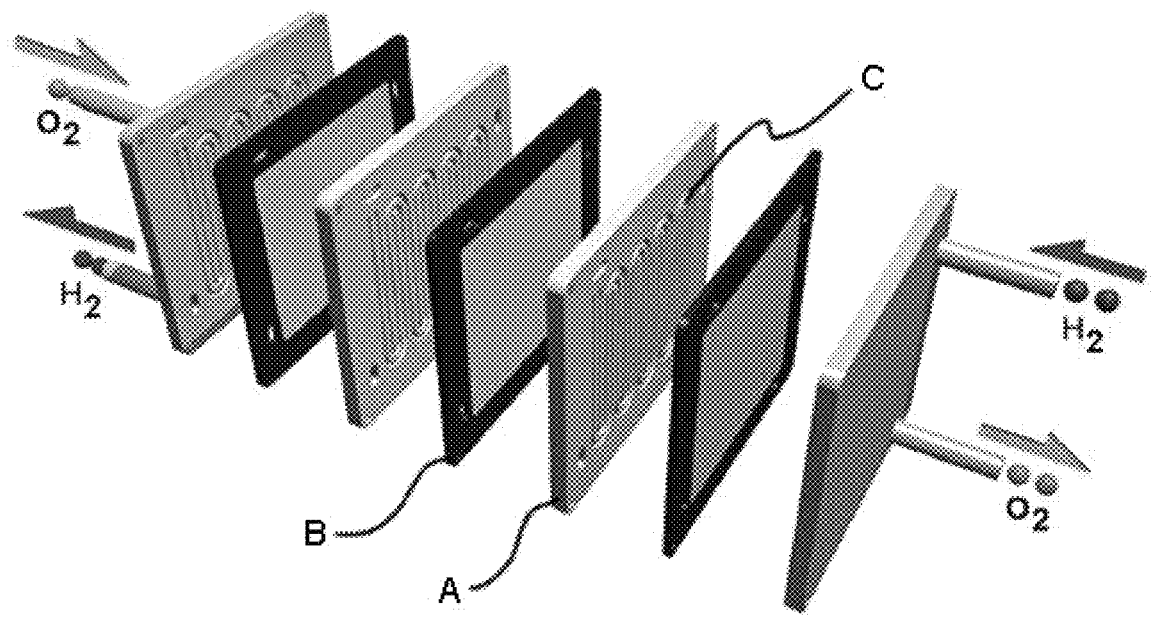

THERMOPLASTIC PREPREG INTERMEDIATE MATERIAL FOR FUEL CELL SEPARATION PLATE AND METHOD FOR MANUFACTURING THERMOPLASTIC PREPREG FOR FUEL CELL SEPARATION PLATE BY USING SAME

CROSS REFERENCE TO RELATED APPLICATIONS

This application is a National Stage of International Application No. PCT/KR2015/010009 filed Sep. 23, 2015, claiming priority based on Korean Patent Application No. 10-2014-0129749 filed Sep. 29, 2014, the contents of all of which are incorporated herein by reference in their entirety.

TECHNICAL FIELD

The present invention relates to a thermoplastic prepreg intermediate material for a fuel cell separation plate and a method for manufacturing thermoplastic prepreg for a fuel cell separation plate by using the same, and more particularly, to a thermoplastic prepreg intermediate material which can decrease a thickness and weight, have excellent durability and efficiently prevent deposition of a precipitate due to hydrophobic properties when water participated in a reaction flows through a gas flow channel of the fuel cell separation plate, thereby being usefully used as a material of the fuel cell separation plate (bipolar plate), as well as a method for manufacturing a thermoplastic prepreg by using the same.

BACKGROUND ART

A fuel cell separation plate (bipolar plate) for composing a fuel cell is disposed between membrane electrode assemblies (hereinafter, referred to as 'MEAs'), as shown in FIG. 1, to form a passage through which fuel is transferred, therefore, can function to diffuse the fuel in the MEAs while playing a role as a passage through which the generated electric current is transferred.

FIG. 1 is an exploded perspective view of a fuel cell.

Accordingly, in order to manufacture a high-performance fuel cell, development of a fuel cell separation plate, that is, bipolar plate, having high electrical conductivity and significantly reduced thickness and weight has been required.

Until now, a carbon fiber composite cured by impregnating a metal plate, graphite plate or carbon fiber with thermo-curable resin has been used for manufacturing a fuel cell separation plate.

The fuel cell separation plate made of a metal plate is generally thick and heavy, hence there is a limitation on the production of a high-performance fuel cell.

The fuel cell separation plate made of a graphite plate may achieve a decrease in a thickness and weight, however, there is a problem of being easy broken and causing a lack of durability.

The fuel cell separation plate made of carbon fiber may achieve a decrease in a thickness and weight and have good durability, however, involve low electrical conductivity due to the thermo-curable resin functioning as a binder. Further, when water participated in a reaction flows through a gas flow channel formed in the fuel cell separation plate, a precipitate is deposited in large quantities inside the gas flow channel, and causes a problem in smoothly delivering oxygen and hydrogen, hence considerably deteriorating a performance of the separation plate.

DISCLOSURE

Technical Problem

An object of the present invention is to provide a thermoplastic prepreg intermediate material (precursor) for a fuel cell separation plate, which can decrease a thickness and weight, have excellent durability, and efficiently prevent deposition of a precipitate in a gas flow channel formed in the fuel cell separation plate due to hydrophobic properties when water participated in a reaction flows through the gas flow channel, thereby achieving excellent performance.

Another object of the present invention is to provide a method for manufacturing a thermoplastic prepreg for a fuel cell separation plate with excellent performance by using the thermoplastic prepreg intermediate material (precursor) for a fuel cell separation plate described above.

Technical Solution

In order to accomplish the above objects, the present invention provides a thermoplastic prepreg intermediate material for a fuel cell separation plate prepared by laminating a hydrophobic thermoplastic resin film, of which (i) a degree of crystallization is 1 to 20%, (ii) a thickness is 3 to 50 μm and (iii) a content of an electroconductive material is 1 to 20% by weight ('wt. %'), on at least one surface of a fiber base.

Further, the present invention provides a thermoplastic prepreg for a fuel cell separation plate manufactured by pressurizing the thermoplastic prepreg intermediate material prepared above at a temperature higher than a melting point of the hydrophobic thermoplastic resin film.

Advantageous Effects

The fuel cell separation membrane manufactured by using the thermoplastic prepreg intermediate material and thermoplastic prepreg of the present invention described above may have decreased thickness and weight, not be easy to break thus to exhibit excellent durability, and efficiently prevent deposition of a precipitate in large quantities inside a gas flow channel formed in the fuel cell separation plate due to hydrophobic properties when water participated in a reaction flows through the gas flow channel, thereby having excellent performance.

DESCRIPTION OF DRAWINGS

FIG. 1 is an exploded perspective view of a fuel cell.

BEST MODE

Hereinafter, the present invention will be described in detail with reference to the accompanying drawing.

FIG. 1 is an exploded perspective view of a fuel cell.

A thermoplastic prepreg intermediate material for a fuel cell separation plate according to the present invention is characterized in that: a hydrophobic thermoplastic resin film, of which (i) a degree of crystallization is 1 to 20%, (ii) a thickness is 3 to 50 μm and (iii) a content of an electroconductive material is 1 to 20% by weight ('wt. %'), is laminated on at least one surface of a fiber base.

More preferably, the fiber base is a fiber sheet in which fibers on a filament are arranged in one direction, in terms of transferring fuel and electric current.

The electroconductive material may include, for example, silver nanowire, carbon nanotube, graphene or carbon black, or the like, and a content of the electroconductive material in the hydrophobic thermoplastic resin film may range from 1 to 20 wt. %.

If the content of the electroconductive material is less than the above range, electrical conductivity is decreased. If the content thereof exceeds the above range, a viscosity of the resin is increased thus to reduce dispersive properties. Therefore, it is not possible to manufacture a uniform thermoplastic prepreg.

The hydrophobic thermoplastic film may have a degree of crystallization ranging from 1 to 20%, and preferably, 3 to 12%. If the degree of crystallization exceeds 20%, thermal shrinking may suddenly occur at a high crystalline stretching portion when the hydrophobic thermoplastic resin film is heated during manufacturing the thermoplastic prepreg for a fuel cell separation membrane, hence causing a phenomenon in which the hydrophobic thermoplastic resin is non-uniformly impregnated within the fiber base.

A thickness of the hydrophobic thermoplastic resin film may range from 3 to 50 μm, and preferably, 7 to 40 μm. If the thickness thereof exceeds 50 μm, the hydrophobic thermoplastic film is not uniformly molten at a contact portion between a surface of the hydrophobic thermoplastic resin film and a surface of the fiber base during manufacturing the thermoplastic prepreg for a fuel cell separation membrane, hence causing a difficulty in uniformly impregnating the hydrophobic thermoplastic resin within the fiber base. If the thickness thereof is less than 3 μm, the hydrophobic thermoplastic resin film is likely to be torn even with a small external force, hence deteriorating workability.

Preferably, a weight ratio of the fiber base:the hydrophobic thermoplastic resin film is adjusted to 65 to 90 wt. %:10 to 35 wt. %, in terms of improving workability and allowing the hydrophobic thermoplastic resin to be uniformly impregnated within the fiber base.

If the weight ratio of the hydrophobic thermoplastic resin film to the fiber base exceeds 35 wt. %, a thickness of the film is too large, and therefore, the hydrophobic thermoplastic resin film is not uniformly molten at the contact portion between the surface of the hydrophobic thermoplastic resin film and the surface of the fiber base during manufacturing the thermoplastic prepreg for a fuel cell separation membrane, hence causing a difficulty in uniformly impregnating the hydrophobic thermoplastic resin within the fiber base. On the other hand, if the weight ratio of the hydrophobic thermoplastic resin film to the fiber base is less than 10 wt. %, a thickness of the film is too small, and therefore, the hydrophobic thermoplastic resin film is likely to be torn even with a small external force, hence deteriorating workability.

The hydrophobic thermoplastic resin film may include, for example, a polypropylene resin film, polyester resin film, thermoplastic polyurethane film, polyethylene resin film, polybutylene terephthalate resin film, polyamide resin film, polyethylene terephthalate resin film, polyphenylene sulfide resin film, polytetrafluoroethylene (e.g., TEFLON™) resin film or polyetherether ketone resin film, or the like.

Next, a method for manufacturing a thermoplastic prepreg for a fuel cell separation plate by using the above-described thermoplastic prepreg intermediate material for a fuel cell separation plate will be described.

A thermoplastic prepreg for a fuel cell separation plate is manufactured by laminating a hydrophobic thermoplastic resin film, of which (i) a degree of crystallization is 1 to 20%, (ii) a thickness is 3 to 50 μm and (iii) a content of an electroconductive material is 1 to 20 wt. %, on at least one surface of a fiber base to prepare a thermoplastic prepreg intermediate material for a fuel cell separation plate; and pressurizing the prepared thermoplastic prepreg intermediate material for a fuel cell separation plate at a temperature higher than a melting point of the hydrophobic thermoplastic resin film.

It is preferable that the heating/pressurizing process is performed with a pressure of 50 to 1,500 kgf/cm at a temperature 30 to 100° C. higher than a melting pint of the thermoplastic film.

If the heating temperature and/or pressure are/is lower than the above range, the hydrophobic thermoplastic resin may not be sufficiently impregnated within the fiber base. On the other hand, if the pressure is higher than the above range, a part of the fiber base may be fractured to cause a decrease in physical properties of the thermoplastic prepreg. Alternatively, if the temperature is higher than the above range, the hydrophobic thermoplastic resin may be deteriorated to cause a decrease in physical properties, thus not being preferable.

Among types of the hydrophobic thermoplastic resin films, polyamide 6 resin film having —COOH or —CO as a functional group in a molecular structure is excluded.

Hereinafter, the present invention will be described in more detail with reference to examples and comparative examples. However, the following examples are proposed as preferred embodiments of the present invention only, and it is duly not construed that the scope of the present invention is particularly limited to these examples.

Example 1

A polyester resin film, of which a degree of crystallization is 3%, a thickness is 30 μm and a content of carbon nanotube is 2 wt. %, was laminated on an upper surface of a fiber base in which carbon fibers on a filament are arranged in one direction, to prepare a thermoplastic prepreg intermediate material for a fuel cell separation plate.

Next, the prepared prepreg intermediate material was heated and pressurized at a temperature of 300° C. and a pressure of 200 kgf/cm, to manufacture a thermoplastic prepreg for a fuel cell separation plate.

In this case, a weight ratio of the fiber base:polyester resin film was adjusted to 70 wt. %:30 wt. %.

The manufactured thermoplastic prepreg for a fuel cell separation plate had a weight variation per unit area of 3%, and therefore, it could be seen that the polyester resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that no breakage occurred thus to demonstrate excellent durability.

Example 2

A polypropylene resin film, of which a degree of crystallization is 7%, a thickness is 30 μm and a content of graphene is 4 wt. %, was laminated on an upper surface of a fiber base in which aramid fibers on a filament are arranged in one direction, to prepare a thermoplastic prepreg intermediate material for a fuel cell separation plate.

Next, the prepared prepreg intermediate material was heated and pressurized at a temperature of 220° C. and a pressure of 200 kgf/cm, to manufacture a thermoplastic prepreg for a fuel cell separation plate.

In this case, a weight ratio of the fiber base:polypropylene resin film was adjusted to 70 wt. %:30 wt. %.

The manufactured thermoplastic prepreg for a fuel cell separation plate had a weight variation per unit area of 4%, and therefore, it could be seen that the polypropylene resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that no breakage occurred thus to demonstrate excellent durability.

Example 3

A polyamide resin film, of which a degree of crystallization is 12%, a thickness is 30 μm and a content of graphene is 20 wt. %, was laminated on an upper surface of a fiber base in which aramid fibers on a filament are arranged in one direction, to prepare a thermoplastic prepreg intermediate material for a fuel cell separation plate.

Next, the prepared prepreg intermediate material was heated and pressurized at a temperature of 260° C. and a pressure of 200 kgf/cm, to manufacture a thermoplastic prepreg for a fuel cell separation plate.

In this case, a weight ratio of the fiber base:polyamide resin film was adjusted to 70 wt. %:30 wt. %.

The manufactured thermoplastic prepreg for a fuel cell separation plate had a weight variation per unit area of 5%, and therefore, it could be seen that the polyamide resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that no breakage occurred thus to demonstrate excellent durability.

Example 4

A polyurethane resin film, of which a degree of crystallization is 20%, a thickness is 30 μm and a content of carbon nanotube is 7 wt. %, was laminated on an upper surface of a fiber base in which carbon fibers on a filament are arranged in one direction, to prepare a thermoplastic prepreg intermediate material for a fuel cell separation plate.

Next, the prepared prepreg intermediate material was heated and pressurized at a temperature of 200° C. and a pressure of 200 kgf/cm, to manufacture a thermoplastic prepreg for a fuel cell separation plate.

In this case, a weight ratio of the fiber base:polyurethane resin film was adjusted to 70 wt. %:30 wt. %.

The manufactured thermoplastic prepreg for a fuel cell separation plate had a weight variation per unit area of 8%, and therefore, it could be seen that the polyurethane resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that no breakage occurred thus to demonstrate excellent durability.

Example 5

A polyethylene terephthalate resin film, of which a degree of crystallization is 7%, a thickness is 3 μm and a content of carbon nanotube is 9 wt. %, was laminated on an upper surface of a fiber base in which carbon fibers on a filament are arranged in one direction, to prepare a thermoplastic prepreg intermediate material for a fuel cell separation plate.

Next, the prepared prepreg intermediate material was heated and pressurized at a temperature of 230° C. and a pressure of 200 kgf/cm, to manufacture a thermoplastic prepreg for a fuel cell separation plate.

In this case, a weight ratio of the fiber base:polyethylene terephthalate resin film was adjusted to 70 wt. %:30 wt. %.

The manufactured thermoplastic prepreg for a fuel cell separation plate had a weight variation per unit area of 4%, and therefore, it could be seen that the polyethylene terephthalate resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that no breakage occurred thus to demonstrate excellent durability.

Example 6

A polyester resin film, of which a degree of crystallization is 7%, a thickness is 10 μm and a content of carbon nanotube is 11 wt. %, was laminated on an upper surface of a fiber base in which carbon fibers on a filament are arranged in one direction, to prepare a thermoplastic prepreg intermediate material for a fuel cell separation plate.

Next, the prepared prepreg intermediate material was heated and pressurized at a temperature of 300° C. and a pressure of 200 kgf/cm, to manufacture a thermoplastic prepreg for a fuel cell separation plate.

In this case, a weight ratio of the fiber base:polyester resin film was adjusted to 70 wt. %:30 wt. %.

The manufactured thermoplastic prepreg for a fuel cell separation plate had a weight variation per unit area of 3%, and therefore, it could be seen that the polyester resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that no breakage occurred thus to demonstrate excellent durability.

Example 7

A polypropylene resin film, of which a degree of crystallization is 7%, a thickness is 20 μm and a content of carbon nanotube is 13 wt. %, was laminated on an upper surface of a fiber base in which carbon fibers on a filament are arranged in one direction, to prepare a thermoplastic prepreg intermediate material for a fuel cell separation plate.

Next, the prepared prepreg intermediate material was heated and pressurized at a temperature of 220° C. and a pressure of 200 kgf/cm, to manufacture a thermoplastic prepreg for a fuel cell separation plate.

In this case, a weight ratio of the fiber base:polypropylene resin film was adjusted to 70 wt. %:30 wt. %.

The manufactured thermoplastic prepreg for a fuel cell separation plate had a weight variation per unit area of 3%, and therefore, it could be seen that the polypropylene resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that no breakage occurred thus to demonstrate excellent durability.

Example 1

A polyamide resin film, of which a degree of crystallization is 7%, a thickness is 40 μm and a content of carbon nanotube is 15 wt. %, was laminated on an upper surface of a fiber base in which carbon fibers on a filament are arranged in one direction, to prepare a thermoplastic prepreg intermediate material for a fuel cell separation plate.

Next, the prepared prepreg intermediate material was heated and pressurized at a temperature of 260° C. and a pressure of 200 kgf/cm, to manufacture a thermoplastic prepreg for a fuel cell separation plate.

In this case, a weight ratio of the fiber base:polyamide resin film was adjusted to 70 wt. %:30 wt. %.

The manufactured thermoplastic prepreg for a fuel cell separation plate had a weight variation per unit area of 6%, and therefore, it could be seen that the polyamide resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that no breakage occurred thus to demonstrate excellent durability.

Example 9

A polyester resin film, of which a degree of crystallization is 7%, a thickness is 30 μm and a content of carbon nanotube is 17 wt. %, was laminated on an upper surface of a fiber base in which carbon fibers on a filament are arranged in one direction, to prepare a thermoplastic prepreg intermediate material for a fuel cell separation plate.

Next, the prepared prepreg intermediate material was heated and pressurized at a temperature of 300° C. and a pressure of 200 kgf/cm, to manufacture a thermoplastic prepreg for a fuel cell separation plate.

In this case, a weight ratio of the fiber base:polyester resin film was adjusted to 80 wt. %:20 wt. %.

The manufactured thermoplastic prepreg for a fuel cell separation plate had a weight variation per unit area of 4%, and therefore, it could be seen that the polyester resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that no breakage occurred thus to demonstrate excellent durability.

Example 10

A thermoplastic polyurethane resin film, of which a degree of crystallization is 7%, a thickness is 30 μm and a content of carbon nanotube is 19 wt. %, was laminated on an upper surface of a fiber base in which carbon fibers on a filament are arranged in one direction, to prepare a thermoplastic prepreg intermediate material for a fuel cell separation plate.

Next, the prepared prepreg intermediate material was heated and pressurized at a temperature of 200° C. and a pressure of 200 kgf/cm, to manufacture a thermoplastic prepreg for a fuel cell separation plate.

In this case, a weight ratio of the fiber base:thermoplastic polyurethane resin film was adjusted to 60 wt. %:40 wt. %.

The manufactured thermoplastic prepreg for a fuel cell separation plate had a weight variation per unit area of 8%, and therefore, it could be seen that the thermoplastic polyurethane resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that no breakage occurred thus to demonstrate excellent durability.

Example 11

A polyethylene terephthalate resin film, of which a degree of crystallization is 7%, a thickness is 30 μm and a content of carbon nanotube is 1 wt. %, was laminated on an upper surface of a fiber base in which carbon fibers on a filament are arranged in one direction, to prepare a thermoplastic prepreg intermediate material for a fuel cell separation plate.

Next, the prepared prepreg intermediate material was heated and pressurized at a temperature of 230° C. and a pressure of 200 kgf/cm, to manufacture a thermoplastic prepreg for a fuel cell separation plate.

In this case, a weight ratio of the fiber base:polyethylene terephthalate resin film was adjusted to 70 wt. %:30 wt. %.

The manufactured thermoplastic prepreg for a fuel cell separation plate had a weight variation per unit area of 3%, and therefore, it could be seen that the polyethylene terephthalate resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that no breakage occurred thus to demonstrate excellent durability.

Example 12

A polyester resin film, of which a degree of crystallization is 7%, a thickness is 30 μm and a content of carbon nanotube is 5 wt. %, was laminated on an upper surface of a fiber base in which carbon fibers on a filament are arranged in one direction, to prepare a thermoplastic prepreg intermediate material for a fuel cell separation plate.

Next, the prepared prepreg intermediate material was heated and pressurized at a temperature of 300° C. and a pressure of 200 kgf/cm, to manufacture a thermoplastic prepreg for a fuel cell separation plate.

In this case, a weight ratio of the fiber base:polyester resin film was adjusted to 70 wt. %:30 wt. %.

The manufactured thermoplastic prepreg for a fuel cell separation plate had a weight variation per unit area of 7%, and therefore, it could be seen that the polyester resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that no breakage occurred thus to demonstrate excellent durability.

Comparative Example 1

A polyester resin film, of which a degree of crystallization is 30%, a thickness is 30 μm and a content of graphene is 2 wt. %, was laminated on an upper surface of a fiber base in which aramid fibers on a filament are arranged in one direction, to prepare a thermoplastic prepreg intermediate material for a fuel cell separation plate.

Next, the prepared prepreg intermediate material was heated and pressurized at a temperature of 300° C. and a pressure of 200 kgf/cm, to manufacture a thermoplastic prepreg for a fuel cell separation plate.

In this case, a weight ratio of the fiber base:polyester resin film was adjusted to 70 wt. %:30 wt. %.

The manufactured thermoplastic prepreg for a fuel cell separation plate had a weight variation per unit area of 15%, and therefore, it could be seen that the polyester resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that a breakage occurred thus to demonstrate poor durability.

Comparative Example 2

A polypropylene resin film, of which a degree of crystallization is 7%, a thickness is 60 μm and a content of graphene is 2 wt. %, was laminated on an upper surface of a fiber base in which aramid fibers on a filament are arranged in one direction, to prepare a thermoplastic prepreg intermediate material for a fuel cell separation plate.

Next, the prepared prepreg intermediate material was heated and pressurized at a temperature of 220° C. and a pressure of 200 kgf/cm, to manufacture a thermoplastic prepreg for a fuel cell separation plate.

In this case, a weight ratio of the fiber base:polypropylene resin film was adjusted to 70 wt. %:30 wt. %.

The manufactured thermoplastic prepreg for a fuel cell separation plate had a weight variation per unit area of 11%, and therefore, it could be seen that the polypropylene resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that a breakage occurred thus to demonstrate poor durability.

Comparative Example 3

A polyamide resin film, of which a degree of crystallization is 7%, a thickness is 30 μm and a content of graphene is 22 wt. %, was laminated on an upper surface of a fiber base in which aramid fibers on a filament are arranged in one direction, to prepare a thermoplastic prepreg intermediate material for a fuel cell separation plate.

Next, the prepared prepreg intermediate material was heated and pressurized at a temperature of 260° C. and a pressure of 200 kgf/cm, to manufacture a thermoplastic prepreg for a fuel cell separation plate.

In this case, a weight ratio of the fiber base:polyamide resin film was adjusted to 45 wt. %:55 wt. %.

The manufactured thermoplastic prepreg for a fuel cell separation plate had a weight variation per unit area of 18%, and therefore, it could be seen that the polyamide resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that a breakage occurred thus to demonstrate poor durability.

Comparative Example 4

A polyethylene terephthalate resin film, of which a degree of crystallization is 7%, a thickness is 30 μm and a content of graphene is 25 wt. %, was laminated on an upper surface of a fiber base in which aramid fibers on a filament are arranged in one direction, to prepare a thermoplastic prepreg intermediate material for a fuel cell separation plate.

Next, the prepared prepreg intermediate material was heated and pressurized at a temperature of 230° C. and a pressure of 200 kgf/cm, to manufacture a thermoplastic prepreg for a fuel cell separation plate.

In this case, a weight ratio of the fiber base:polyethylene terephthalate resin film was adjusted to 70 wt. %:30 wt. %.

The manufactured thermoplastic prepreg for a fuel cell separation plate had a weight variation per unit area of 26%, and therefore, it could be seen that the polyethylene terephthalate resin was uniformly impregnated within the fiber base.

A fuel cell separation plate was molded by using the prepreg for a fuel cell separation plate manufactured as described above, then a continuous operation test was executed on the fuel cell separation plate for 100 hours to assess durability. As a result of the assessment, it could be seen that a breakage occurred thus to demonstrate poor durability.

The weight variation per unit area of the thermoplastic prepreg was calculated by taking 10 samples having the same unit area from the thermoplastic prepreg, estimating an average weight (W0) of the 10 samples, and then, substituting a weight (W1) of one among the above samples, which has the biggest difference from the above average weight, for the following Equation (I) or (II).

$$\text{Gravity variation per unit area}(\%) = \frac{(W0 - W1)}{W0} \times 100 \quad \text{(I)}$$

-continued $$\text{Gravity variation per unit area}(\%) = \frac{(W1 - W0)}{W0} \times 100 \quad \text{(II)}$$

DESCRIPTION OF REFERENCE NUMERALS

A: fuel cell separation plate (bipolar plate)
B: membrane electrode assembly (MEA)
C: gas flow channel

INDUSTRIAL APPLICABILITY

The present invention may be used as a material for a fuel cell separation plate.

The invention claimed is:

1. A thermoplastic prepreg intermediate material for a fuel cell separation plate, consisting of
a fiber base; and
a hydrophobic thermoplastic resin film, of which (i) a degree of crystallization is 1 to 20%, (ii) a thickness is 3 to 50 μm and (iii) a content of an electroconductive material is 1 to 20% by weight (wt. %),
wherein said hydrophobic thermoplastic resin film is laminated on at least one surface of the fiber base and wherein the laminated hydrophobic thermoplastic resin film is a single layer.

2. The thermoplastic prepreg intermediate material for a fuel cell separation plate according to claim 1, wherein the electroconductive material is one selected from the group consisting of silver nanowire, carbon nanotube, graphene and carbon black.

3. The thermoplastic prepreg intermediate material for a fuel cell separation plate according to claim 1, wherein the degree of crystallization of the hydrophobic thermoplastic resin film is 3 to 12%.

4. The thermoplastic prepreg intermediate material for a fuel cell separation plate according to claim 1, wherein the thickness of the hydrophobic thermoplastic resin is 7 to 40 μm.

5. The thermoplastic prepreg intermediate material for a fuel cell separation plate according to claim 1, wherein a weight ratio of the fiber base:the hydrophobic thermoplastic resin film is 65 to 90 wt. %: 10 to 35 wt. %.

6. The thermoplastic prepreg intermediate material for a fuel cell separation plate according to claim 1, wherein the fiber base is a fiber sheet in which fibers on a filament are arranged in one direction.

7. The thermoplastic prepreg intermediate material for a fuel cell separation plate according to claim 1, wherein the hydrophobic thermoplastic resin film is one selected from the group consisting of a polypropylene resin film, polyester resin film, thermoplastic polyurethane film, polyethylene resin film, polybutylene terephthalate resin film, polyamide resin film, polyethylene terephthalate resin film, polyphenylene sulfide film, polytetrafluoroethylene resin film, and polyetherether ketone resin film.

8. A method for manufacturing a thermoplastic prepreg for a fuel cell separation plate, comprising:
laminating a hydrophobic thermoplastic resin film, of which (i) a degree of crystallization is 1 to 20%, (ii) a thickness is 3 to 50 pm and (iii) a content of an electroconductive material is 1 to 20 wt. %, on at least one surface of a fiber base to prepare a thermoplastic prepreg intermediate material for a fuel cell separation plate; and
pressurizing the prepared thermoplastic prepreg intermediate material for a fuel cell separation plate at a temperature higher than a melting point of the hydrophobic thermoplastic resin film,
wherein the thermoplastic prepreg intermediate material consists of the hydrophobic thermoplastic resin film laminated on at least one surface of the fiber base, and wherein the laminated hydrophobic thermoplastic resin film is a single layer.

9. The method according to claim 8, the pressurizing process is performed with a pressure of 50 to 1,500 kgf/cm at a temperature 30 to 100° C. higher than the melting point of the hydrophobic thermoplastic resin.

\* \* \* \* \*